United States Patent [19]

Mailliet

[11] 4,063,722
[45] Dec. 20, 1977

[54] EJECTOR PISTON

[75] Inventor: Pierre H. Mailliet, Howald, Luxembourg

[73] Assignee: S.A. des Anciens Etablissements Paul Wurth, Luxembourg, Luxembourg

[21] Appl. No.: 743,802

[22] Filed: Nov. 22, 1976

[30] Foreign Application Priority Data

Nov. 26, 1975 Luxembourg .......................... 73869

[51] Int. Cl.² .............................................. C21B 7/12
[52] U.S. Cl. ................................................ 266/273
[58] Field of Search ............................ 266/271–273; 92/182, 206

[56] References Cited

U.S. PATENT DOCUMENTS

| 1,365,578 | 1/1921 | Zippler | 92/182 |
| 2,110,379 | 3/1938 | Lannert | 92/182 |
| 2,529,053 | 11/1950 | Simmons | 92/182 |
| 3,834,719 | 9/1974 | Shin et al. | 92/182 |
| 3,984,091 | 10/1976 | Schneider | 266/273 |

Primary Examiner—Gerald A. Dost

[57] ABSTRACT

Leakage of viscous material past an ejector piston, for example the piston of a clay gun employed in plugging blast furnace tapholes, is eliminated by a piston and ring design which exposes in excess of 50% of the leading and inner diameter surfaces of an expandable ring directly to the viscous material. Also, the leading face of the piston ring is outwardly inclined in the direction of piston travel and a complementary surface to this inclined face is provided on the piston. Expansion of the ring results from the reaction on the inclined face and inner diameter of the pressurized viscous material.

31 Claims, 13 Drawing Figures

EJECTOR PISTON

BACKGROUND OF THE INVENTION:

1. Field of the Invention

The present invention relates to dispensers for viscous materials and particularly to apparatus for use in the injection of a sealing compound into the taphole of a blast furnace for the purpose of closing the hole. More specifically, this invention is directed to minimizing leakage past the piston of an injector mechanism, for example a clay gun associated with a blast furnace, by insuring a close fit between the injector piston and walls of the cylinder in which it moves under all operating conditions. Accordingly, the general objects of the present invention are to provide novel and improved apparatus and methods of such character.

2. Description of the Prior Art

While not limited thereto in its utility, the present invention is particularly well suited for use in and thus will be discussed in the environment of apparatus employed for sealing the pouring holes of a shaft furnace. Such sealing devices are known in the art as "clay guns". Reference may be had to U.S. Pat. No. 3,765,663, which is assigned to the assignee of the present invention, for a general discussion of the operation of clay guns.

As reported in the referenced patent, the pouring or tapholes of a shaft furnace, for example a blast furnace employed in the production of steel, are plugged by injecting thereinto a sealing compound, for example clay or some anhydrous material, which hardens rapidly. A clay gun is conventionally provided with a hydraulic jack which actuates an ejector piston. The ejector piston of the clay gun slides within a clay chamber and forces material supplied to this chamber through a "nose" which is inserted into the furnace taphole. Modern blast furnaces operate at very high counterpressures and thus the sealing compound; i.e., the clay; must be ejected from the clay gun at a very high pressure. The most practical manner of developing the requisite injection pressure for the sealing compound is to actuate the ejector piston of the clay gun by means of a hydraulic jack.

Continuing with a discussion of the problems associated with clay guns, the harsh operating conditions to which such apparatus is exposed presents operational problems which are exceptionally difficult to overcome. Thus, because of the high temperatures to which the apparatus is exposed and the presence of abrasive particles in the sealing material, clearance must be provided between the ejector piston and the wall of the cylinder in which it moves in order to insure against the binding of the piston as a result of either thermally induced deformations of the cylinder walls or because of the presence of particulate matter between the piston and the cylinder wall. However, the clearance between the piston and cylinder wall must be minimized in the interest of preventing the pressurized sealing material from leaking past the piston. Any sealing material which gets behind the ejector piston may prevent proper operation of the clay gun through accumulation which prevents the free movement thereof and also through scoring the polished surface of the hydraulic jack piston rod thereby resulting in hydraulic fluid leakage.

Prior art clay gun ejector pistons have included one or more piston rings to insure a close fit between the piston and the wall of the clay chamber cylinder in which it moves. In the case of modern furnaces, the clay guns may operate at nominal pressures which exceed 200 kg/cm$^2$ and at these pressures the sealing action of conventional piston-piston ring arrangements has been found to be inadequate; i.e., the rings do not contact the walls of the cylinder with sufficient force to contain the sealing compound at the high pressures involved.

The use of a single piston ring of comparatively large dimensions and with a strong pre-compression has been unsuccessfully implemented as the solution to the leakage problem. It has also been purposed to employ a single piston ring having a rearwardly facing surface which extends rearwardly from the inner diameter of the ring at an oblique angle relative to the axis of the ejector piston and to provide a complementary surface on the piston. This arrangement results in the ring being forced outwardly during the delivery stroke of the piston as a result of the contact between the angled complementary surfaces on the piston and piston ring. The desired expansion of the piston ring requires that force be exerted on the front face of the ring and, accordingly, the front of the ring must be exposed to the sealing compound. Accordingly, the ring must be received in an annular groove and, in prior art proposals, the ring was held in position in such annular groove by a disc or plate affixed to the front face of the piston; the holding disc or plate thus in part defining the groove in which the piston ring was disposed. In order for the sealing compound to contact the front face of the piston ring, the retaining plate was of smaller dimensions than the cross-sectional area of the piston. Also, the groove which receives the piston ring must necessarily be wider and deeper than the corresponding dimensions of the ring itself. In the prior art, accordingly, sealing compound can pass by the outer edge of the retaining plate and collect in the gap between the front face of the ring and the plate and also between the inner diameter of the ring and the piston. This results in the clay exerting a force on both front and inner faces of the piston ring and these forces tend to induce expansion of the ring on the delivery stroke of the piston.

The above described concept of the use of a piston ring and groove, with complementary surfaces on the rear face of the piston ring and on a forwardly facing surface of the piston, has not solved the problems of achieving a tight substantially leakage free fit between the piston and cylinder of a clay gun which operates at a very high pressure. Thus, the fact that the clay must pass around the retaining plate before acting on the ring reduces the force applied to the front of the ring and thus reduces the expansion resulting from the oppositely directed pressure of the clay and the pressure from the action of the piston at the oblique profile at the rear face of the ring. Also, the clay or other sealing material tends to harden and become encrusted between the retaining disc and the ring and also between the piston ring and the piston thereby progressively reducing the desired expansion effect during the delivery stroke to zero. Further, during the return stroke of the piston the ring is pressed against the retaining disc and, in time, this forwardly directed pressure on the plate results in an unacceptably large clearance between the rear face of the ring and the complementary oblique face of the piston.

As a further disadvantage of the above described technique and apparatus, the clay between the inner diameter of the piston ring and the piston will be forced into the space between the complementary obliquely angled surfaces on the ring and piston and will form a crust in this area. Such a crust, in addition to nullifying the effect of the complementary oblique surfaces on the ring and front face of the piston, may also cause rapid wear of and damage to the ring through the irregular transmission of power from the piston thereto during the delivery stroke.

SUMMARY OF THE INVENTION:

The above discussed deficiencies and disadvantages of the prior art are overcome by a novel and improved piston assembly for use in the dispensing of viscous materials which insures a close fit between the piston and the wall of the cylinder in which it moves regardless of the constitution of the material being expelled through a nozzle by the piston or the ambient operating conditions. The improvements of the present invention may, in part, be attributed to a novel piston ring design which includes at least a first ring held in position on an ejector piston by a holding plate which in part defines the front face of the piston. The holding plate and front face of the piston ring are provided with cooperating faces which lie in parallel planes oriented obliquely to a plane perpendicular to the direction of motion of the piston; the front face of the ring sloping upwardly and outwardly from the inner diameter of the ring. The holding plate is designed such that a significant portion of the oblique front face of the piston ring is directly exposed to the material in the cylinder forward of the piston whereby this material will act directly on the piston ring during the forward stroke of the piston.

In accordance with a preferred embodiment of the invention the holding plate is in the form of a disc or annulus having a plurality of arms extending outwardly from its periphery; i.e., the holding plate is generally "star" shaped. The outwardly extending arms are formed so as to cover less than 50% of the total surface area of the obliquely angled front face of the piston ring.

In accordance with one embodiment of the invention, a pair of piston rings which abut one another along surfaces oriented generally perpendicularly to the direction of motion of the piston are employed. When a pair of cooperating piston rings are employed the front face of the forwardly disposed ring is cut at an oblique angle as described above and the rearwardly facing surface of the second or rearwardly disposed ring may be oriented at an angle with respect to a plane perpendicular to the direction of motion of the piston. If the second ring has an angled rearwardly facing surface, this surface will cooperate with a complementary surface on a front face of the piston body; the angled front face on the piston body sloping generally toward the trailing end of the piston whereby cooperation between the body and rearwardly disposed piston ring will urge the piston ring outwardly toward the wall of the cylinder in which the piston moves.

In accordance with another embodiment of the invention a single piston ring having oppositely sloped leading and trailing faces may be employed. This single ring will be held on the piston by means of a holding plate and both the holding plate and front face of the piston may be designed so as to insure direct contact between a substantial portion of the area of both the front face and inner diameter of the piston ring with the material being forced through the cylinder in which the piston moves.

BRIEF DESCRIPTION OF THE DRAWING

The present invention will be better understood and its various objects and advantages will become apparent to those skilled in the art by reference to the accompanying drawing wherein like reference numerals refer to like elements in the several figures and in which.

Figure 1:
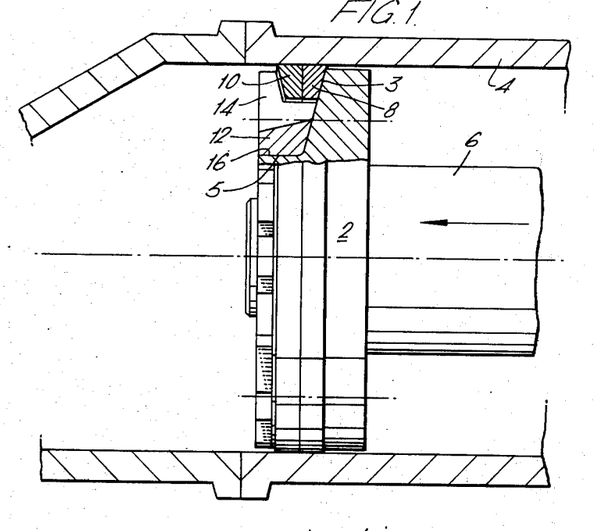
FIG. 1 is a partial longitudinal side elevation view, partly in section, of a clay gun employing a piston assembly in accordance with a first embodiment of the present invention.

DESCRIPTION OF THE PREFERRED EMBODIMENTS:

With reference now to FIG. 1, a first embodiment of the present invention is disclosed in the environment of a clay gun for use in the plugging of tapholes in a blast furnace through the injection, at a very high pressure, of a sealing compound into the tapholes via a nozzle. As shown in FIG. 1, the clay gun ejector piston is indicated at 2. Piston 2 is disposed within a cylinder 4 which will be filled in front; i.e., to the left of piston 2 as the device is shown in FIG. 1; with the sealing compound. Motion will be imparted to piston 2 by means of a piston rod 6 which is the output member of a hydraulic actuator. During the delivery stroke; i.e., when the sealing compound is being forced into the taphole of a blast furnace, piston 2 and piston rod 6 will move in the direction of the arrow shown on the piston rod in FIG. 1. A portion of the piston assembly 2 of FIG. 1, corresponding to section line A—A of FIG. 2, has been shown in cross-section.

One of the problems to which the present invention is addressed is the necessity of preventing the clay or other sealing compound from leaking past piston 2 and accumulating in cylinder 4 behind the piston and on the piston rod 6. As noted above, in view of the gritty nature of the sealing material and also because of the fact that the clay gun is operated in an environment which causes it to be exposed to very high temperatures, clearance must be provided between the periphery of piston 2 and the wall of cylinder 4 in order to insure that the piston will not bind. There is, however, a somewhat contradictory requirement that leakage of the clay to the rod side of piston 2 must be minimized through insuring a tight fit between the piston and cylinder. These conflicting requirements are met through the use of an "elastic" piston ring which is intended to conform to the contour of the inner surface of cylinder 4 when piston 2 is in motion. The piston ring must, to perform properly, press strongly against the inner wall of the clay chamber to counteract the forces exerted by the clay on the ring during the delivery stroke.

Figures 2, 2A:
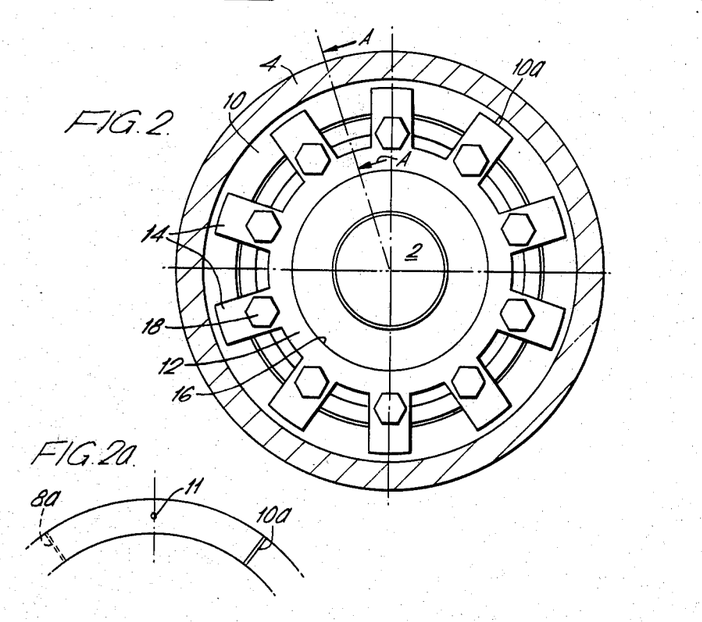
FIG. 2 is a front view of the piston of the embodiment of FIG. 1.
FIG. 2a is a partial view of the piston ring of the embodiment of FIGS. 1 and 2.
Figure 3:
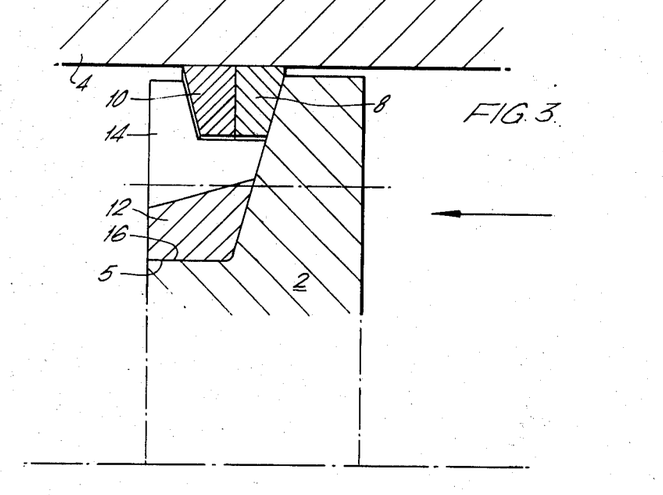
FIG. 3 is a cross-sectional side elevation view, on an enlarged scale, of a portion of the piston of the embodiment of FIG. 1.

Referring now jointly to FIGS. 1-3, in accordance with a first embodiment of the present invention a piston ring assembly comprised of a pair of ring segments 8 and 10 is mounted on piston 2. The piston ring assembly comprising ring segments 8 and 10 is designed to convert at least some of the longitudinal forces applied to piston 2 during a power or delivery stroke into an outwardly directed radial force applied to the piston ring or ring segments whereby the piston ring assembly will be caused to expand and be urged against the wall of cylinder 4. In the embodiment of FIGS. 1-3 each of members 8 and 10 has a trapezoidal cross-section. The forwardly disposed ring segment 10 has an inclined leading face which extends outwardly and forwardly, from the inner diameter of the ring, at an oblique angle. Ring segments 8 and 10 abut on surfaces which are oriented substantially transverse to the longitudinal axis along which piston 2 moves and the trailing face of ring segment 8 slopes upwardly and rearwardly at an oblique angle with respect to the aforesaid longitudinal axis. Thus, as may be seen from FIGS. 1 and 3, the oppositely disposed leading and trailing faces of the piston ring assembly comprised of rings 8 and 10 presents generally oppositely sloped end surfaces. The function of these oppositely sloped surfaces will be described in detail below. For purposes which will also be discussed below, piston 2 may be provided with a forwardly facing surface 3 cut at an angle complementary to the slope of the rearwardly facing inclined end surface of ring segment 8.

In the embodiment of FIGS. 1-3 the ring segments 8 and 10 are held on piston 2 by means of a holding plate 12. Plate 12, as may best be seen from a joint consideration of FIGS. 2 and 3, has a generally annular shape with a plurality of outwardly radiating fingers 14. The forwardly disposed end of piston 2 has a portion of reduced diameter which extends rearwardly to the inner termination of sloped wall portion 3. The central aperture in holding plate 12 is commensurate in diameter with the reduced diameter forward portion of piston 2 whereby the plate is received on the piston and the plate and piston are in abutting relationship on respective surfaces 16 and 5. With reference to FIG. 2, plate 12 is held in position on piston 2 by means of a plurality of bolts 18 which pass through fingers 14 and engage piston 2. The fingers 14 of holding plate 12 are, as may be seen from FIGS. 1 and 3, provided with cut-outs in their rearwardly disposed edges. These cut-outs define the front and bottom surfaces of the groove which receives the piston ring segments 8 and 10. The rearwardly facing sidewalls of the cut-outs in fingers 14 are inclined at an angle which is complementary to the angle defined by the front face of piston segment 10.

From the description above and from consideration of FIGS. 1 and 3 it may be seen that the base of the groove which receives the piston ring is discontinuous; i.e., the diameter of the piston assembly consisting of piston body 2 and holding plate 12 approaches the inner diameter of the piston ring assembly comprised of ring segments 8 and 10 only in the region of fingers 14. In the spaces between fingers 14 the holding plate 12 is of reduced thickness, such that the inner diameter of the piston ring will be unsupported and may be directly exposed to the material in cylinder 4 in front of piston 2. The obliquely angled front surface of piston ring segment 10 is also directly exposed to the material in cylinder 4 in the spaces between holding plate fingers 14. The total exposed surface area of the piston ring, situated between fingers 14, is preferably in excess of the total area behind the fingers; i.e., more than fifty percent of the surface area of the leading face of ring segment 10 and the inner diameters of ring segments 8 and 10 will be in direct contact with the pressurized material in cylinder 4 in front of piston 2. Accordingly, the material in the cylinder will, during a delivery stroke of piston 2, react with and thus exert forces on the sloped front face and the inner diameter of the piston ring.

In accordance with a preferred embodiment of the invention the segments 8 and 10 of the piston ring consist of resilient split rings. Ring segments 8 and 10 have an outer diameter which is greater than the inner diameter of cylinder 4 and, accordingly, the ring segments are pre-compressed during installation and, when in position on the piston, are spring loaded against the cylinder wall. As shown in FIG. 2a, the openings 8a and 10a, which respectively permit radial expansion of ring segments 8 and 10, are offset with respect to one another so as to prevent the passage of clay through the ring assembly. The opening or split 10a in the forwardly disposed ring segment 10 will be positioned behind one of the fingers 14 on holding plate 12 as depicted in FIG. 2. Rotation of the ring segments 8 and 10, either as a unit or with respect to one another, will be prevented by a pin 11 which engages segments 8 and 10; pin 11 extending either from one of the fingers 14 of plate 12 or from surface 3 of piston body 2.

Discussing further the structural details of holding plate 12 in accordance with a preferred embodiment of the invention, the reduced width portions of the annular plate located between the fingers 14 have bottom surfaces which slope upwardly and rearwardly with respect to the direction of piston travel. As a result of this sloped contour at the base of the spaces between fingers 14 of plate 12, the material within the cylinder is forced against the inwardly facing of ring segments 8 and 10 thus inducing the piston ring to expand as the piston advances. This expansion may be accommodated through the use of a split ring type construction for ring segments 8 and 10. A detailed description of the mode of expansion and a further discussion of the design of the piston ring or ring segments in accordance with the present invention will be set forth below in connection with FIGS. 9 and 10. The surfaces of holding plate 12 which abut the inclined surface 3 of piston 2 will, as shown, be complementary in shape thereto.

Figure 4:
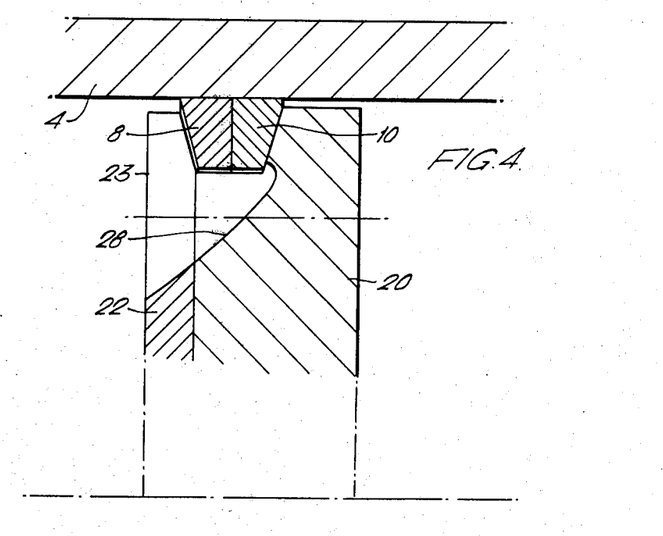
FIG. 4 is a partial cross-sectional side elevation view of a piston assembly in accordance with another embodiment of the present invention.

Considering now FIG. 4, a second embodiment of the present invention is depicted wherein a holding plate 22, which in part defines the piston ring receiving groove, is in the form of a generally flat annularly shaped disc having a plurality of radially extending fingers 23. In contradistinction to the embodiment of FIGS. 1-3, the holding plate of the embodiment of FIG. 4 serves to define only the obliquely angled forwardly disposed end of the piston ring receiving groove. In order to insure contact between the inner diameters of piston ring segments 8 and 10 and the clay, thereby permitting the clay to exert radial pressure on the piston ring, the embodiment of FIG. 4 employs either a ring with notches 28 fitted to the front face of piston 20 or the body of the piston itself is notched. As may be seen from FIG. 4, which is a cross-sectional view taken between two adjacent fingers 23 of the disc shaped holding plate 22, the notches 28 are generally triangular in cross-section. Thus, to summarize the embodiment of FIG. 4, the piston ring or ring segments 8 and 10 are disposed in a groove having a forward side defined by a sloped surface on the rearwardly facing side of the fingers 23 of holding plate 22, a bottom defined by the body of the piston in the regions between the notches 28 in the face of piston 20 and a rear wall defined by the rearwardly inclined forwardly facing surface on the piston 20.

Figure 5:
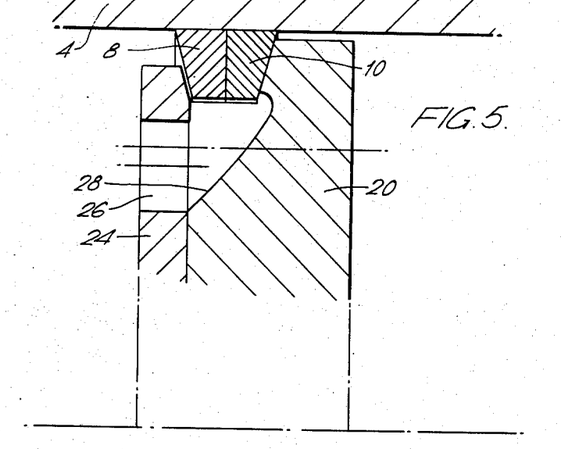
FIG. 5 is a partial cross-sectional side elevation view of a piston assembly in accordance with a further embodiment of the present invention.

The embodiment of FIG. 5, while similar to the embodiment of FIG. 4, may be distinguished therefrom by the use of a holding plate 24 which is not provided with a plurality of outwardly extending fingers. Thus, to promote direct contact between the clay and the inner diameter of the piston ring, the holding plate 24 of the FIG. 5 embodiment is provided with a plurality of apertures 26 aligned with the notches 28 in the front face of piston 20. It is additionally to be noted that the outer diameter of plate 24 of the FIG. 5 embodiment is reduced when compared with that of the embodiments of FIGS. 1-4 thus increasing the forwardly facing surface area of the piston ring which will be directly acted upon by the pressurized material in the cylinder in front of piston 20.

Figure 6:
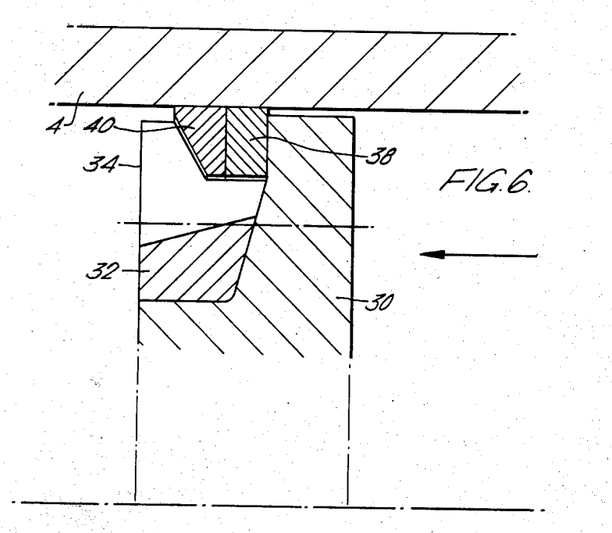
FIG. 6 is a partial cross-sectional side elevation view of a piston assembly in accordance with yet another embodiment of the present invention.

A further embodiment of the present invention is depicted in FIG. 6. In FIG. 6 the piston ring mounted on piston 30 is defined by a pair of ring segments 38 and 40. In contradistinction to the embodiment of FIGS. 1-3, the rearwardly disposed segment 38 of the piston ring in the FIG. 6 embodiment is of rectangular shape; i.e., the rearwardly facing side of the piston is not inclined at an oblique angle. Accordingly, the cooperating leading face on the piston 30, which must have a shape which is complementary to that of the cooperating surface on the piston ring, will be oriented generally transverse to the direction of motion of the piston. As in the embodiment of FIGS. 1-3, the piston ring segments 38 and 40 are held in position by a holding plate 32 having radial fingers 34. The complementary sloped surfaces of ring segment 40 and fingers 34 define parallel planes which intersect a plane transverse to the direction of motion of the piston at a greater angle than do the same surfaces in the embodiment of FIGS. 1-3. The angle of inclination of the leading face of ring segment 40 must be approximately twice the inclination angle of the leading face of segment 10 in the embodiment of FIGS. 1 through 3 if the piston ring is to be urged against the wall of the cylinder in the FIG. 6 embodiment with the same force as in the embodiment of FIGS. 1-3.

Figure 7:
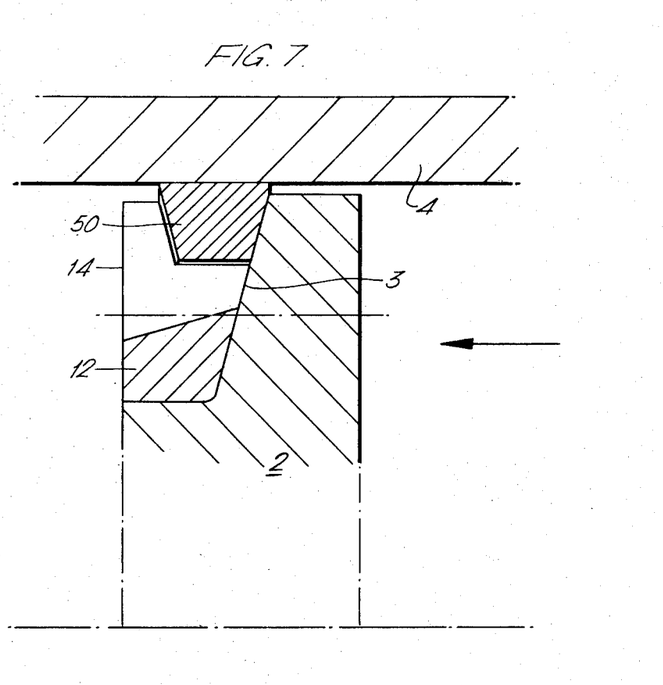
FIG. 7 is a partial cross-sectional side elevation view of a piston assembly in accordance with still another embodiment of the present invention.
Figure 7A:
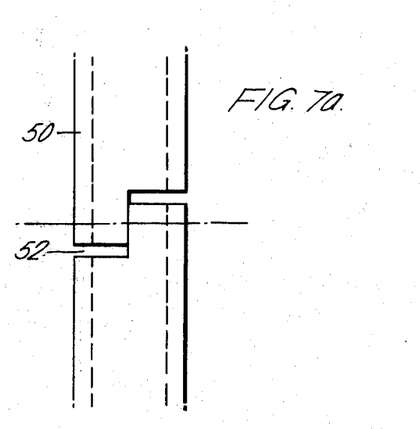
FIG. 7a is a partial top view of the piston ring of the embodiment of FIG. 7.

Another embodiment of the invention is shown in FIG. 7. The embodiment of FIG. 7 differs from the embodiment of FIGS. 1-3 only in that the piston ring 50 is of unitary construction rather than being comprised of a pair of ring segments. As may be seen from FIG. 7a, the piston ring 50 is of split-ring type construction, with a staggered opening as indicated at 52, thus making expansion possible while minimizing the chance of leakage through the piston ring itself.

Figure 8:
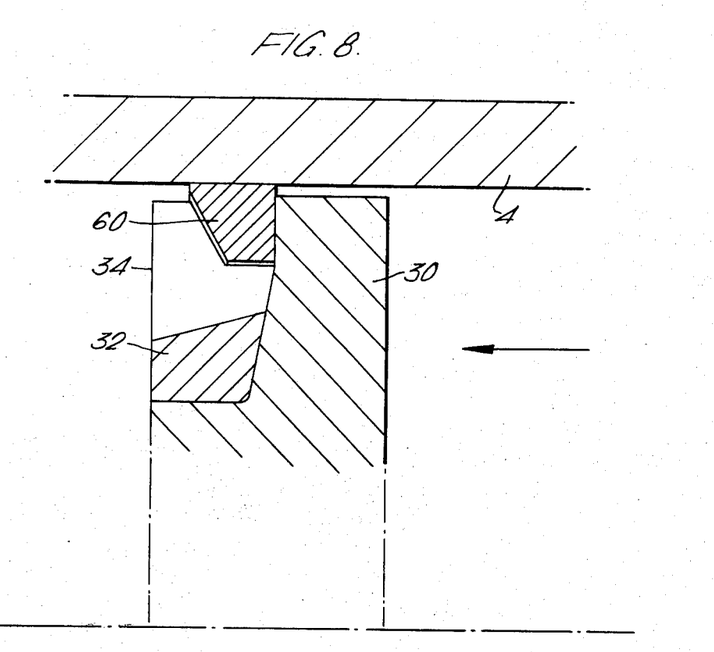
FIG. 8 is a partial cross-sectional side elevation view of a piston assembly in accordance with an additional embodiment of the present invention.
Figure 8A:
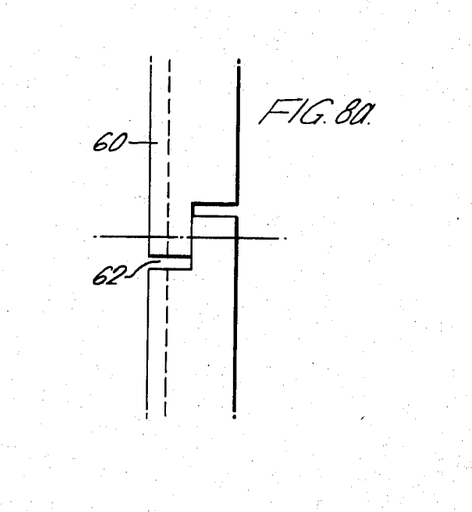
FIG. 8a is a partial top view of the piston ring of the embodiment of FIG. 8.

The embodiment shown in FIG. 8 is identical to the embodiment of FIG. 6 with the exception that, as in the case of the embodiment of FIG. 7, the piston ring 60 is of unitary construction. As shown in FIG. 8a, piston ring 60 may be of split-ring type construction with an overlapping or staggered gap as indicated at 62.

While the force with which the piston ring is urged against the wall of cylinder 4 is independent of the number of ring segments, it has been found preferable to employ a pair of ring segments as depicted in the embodiments of FIGS. 1-3, 4, 5 and 6 since use of a pair of ring segments appears to minimize the risk of leakage past the piston. It is, however, within the spirit and scope of this invention to employ more than two ring segments. It is also to be observed that the features of the embodiments of FIGS. 1-8 can, within the scope of the invention, be combined in various manners. Thus, either a unitary or segmented piston ring construction may be employed and the rearwardly facing surface of the selected ring may be inclined at an oblique angle or be oriented generally transversely of the direction of piston travel.

Figure 9:
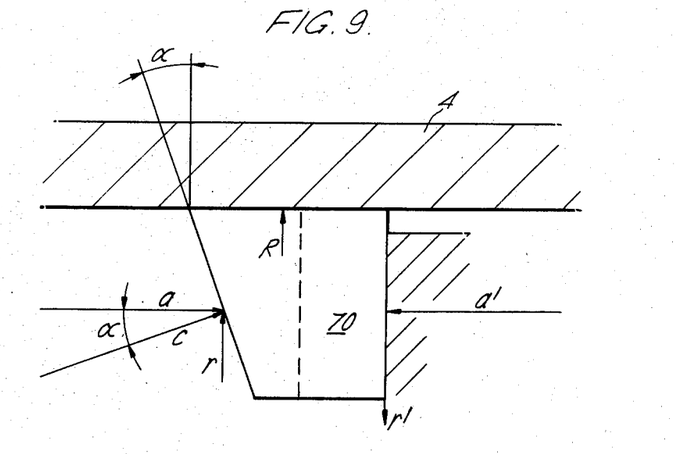
FIGS. 9 and 10 are diagrammatic showings of the forces which act on the piston rings of piston assemblies in accordance with the present invention.

Referring now to FIG. 9, and bearing in mind that clearance will be provided between the oppositely disposed end faces of the piston and the members which define the sidewalls of the groove in which the piston ring is disposed so as to permit the radial expansion and contraction of the ring, the functioning of the embodiment of FIG. 8 will now in part be described. In the discussion below it should be kept in mind that the manner of operation of the unitary ring construction of FIG. 8 will be identical to that of the segmented ring construction of FIG. 6. At least fifty percent of the surface area of the sloped leading or front face of the piston ring 70 is in contact with the pressurized material within the cylinder in front of the piston. The leading face of piston ring 70 is inclined, with respect to a perpendicular plane through the longitudinal axis of piston travel, at an angle $\alpha$. During a sealant delivery stroke; i.e., on the forward stroke of the piston in the clay chamber to force clay through a nozzle into a furnace taphole, a longitudinal force $a'$ is exerted on the piston ring by the piston. A reaction force from the clay, indicated by vector $c$, will be developed perpendicular to the inclined leading face of piston 70. The force $c$ has a longitudinal component $a$ and a radial component $r$. The radial force component $r$ ends to cause ring 70 to expand radially and thus to tightly contact the inner diameter of the cylinder. The force which tends to cause ring 70 to expand is opposed by friction between the rearwardly disposed sidewall of the piston ring and the surface of the piston which is contacted thereby; this frictional force being indicated by vector $r_1$. The frictional force $r_1$ is parallel to the expansive force $r$ but in the opposite direction whereby the resultant force R which, in part, causes the expansion of piston 70 equals the difference between forces $r$ and $r_1$. In accordance with the present invention the angle of inclination $\alpha$ of the leading face of piston ring 70 is selected such that the radial force component $r$ will always exceed the frictional resistance $r_1$. The angle of inclination $\alpha$ will be calculated taking into account the materials employed in the piston and piston ring; knowledge of the nature of the materials from which the piston ring and piston are formed and the area of surface contact therebetween enabling the frictional resistance $r_1$ to be calculated; the frictional resistance $r_1$ being represented by the formula:

$$r_1 = \mu\, a'$$

where $a'$ is the force perpendicular to the surfaces and $\mu$ is the coefficient of friction of the materials. The coefficient of friction, in turn, is a function of the angle of slide $\rho$ and may be expressed as $\mu = \tan \rho$. Since the radial force component $r$ is also a tangential function of the force component $a$, the net radial force R exerted on the ring and thus the force exerted by the ring against the wall of the cylinder may be expressed as follows:

$$R = a \tan (\alpha - \rho)$$

If there is to be a radial force exerting pressure toward the wall of the cylinder, ignoring any force applied directly to the inner diameter of the piston ring or resulting from precompression of the rings the angle of inclination $\alpha$ must be greater than the angle of slide $\rho$. In calculating the angle of inclination it is not necessary to take into account any friction between the inclined forwardly facing surface of the piston ring and the clay within the clay gun cylinder since the clay is not a solid medium and thus its resistance to expansion of the ring is negligible.

Figure 10:
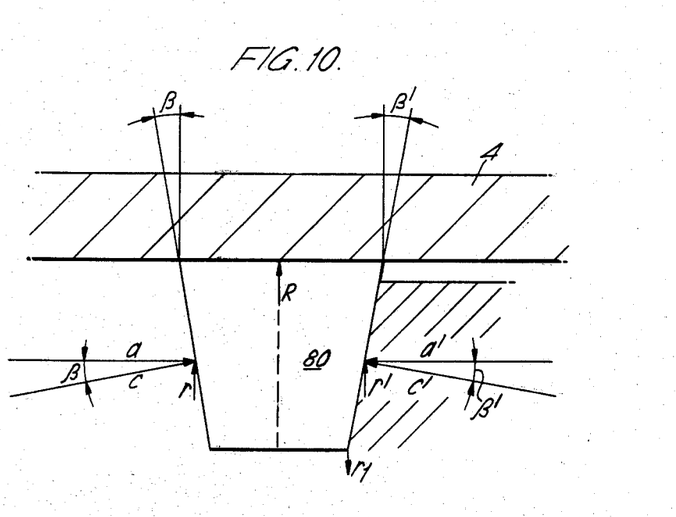

An analysis similar to that provided for FIG. 9 can be developed for FIG. 10 wherein the piston ring 80 is either of unitary construction or segmented and presents a pair of oppositely inclined faces. While the angles of inclination $\beta$ and $\beta'$, respectively of the leading and trailing faces of piston ring 80, need not necessarily be equal, in practice it is preferable for these angles to be the same. The force with which the piston acts on the ring is represented in FIG. 10, by the vector $c'$ which has a longitudinal component $a'$ and a radially outwardly directed component $r'$. As discussed with respect to FIG. 9, piston ring 80 is subject to a reaction force $c$ from the clay which may be broken down into a longitudinal component $a$ and an outwardly directed radial component $r$. The radial force components $r$ and $r'$ are parallel, in the same direction and would be equal if there was no frictional resistance $r_1$ at the rear face of ring 80. The radial force acting on the piston ring, again ignoring any radial force applied to the inner diameter of the ring or resulting from compression of the ring, may be represented as follows:

$$R = r + r' - r_1$$

Taking into account the angle of friction $\rho$, the net radial force may be expressed as:

$$R = a \tan (2\beta - \rho)$$

assuming that the angle of inclination $\beta$ equals the angle of inclination $\beta'$. Thus, in order to develop a radial force acting in the outward direction, the sum of the two angles $\beta$ and $\beta'$ must be greater than $\rho$.

From the above discussion it may be seen that, independently of the number of segments comprising the piston ring, the leading, and in some instances the trailing, face of the piston ring will be cut at an angle which can be calculated in terms of the radial force required.

It is also to be observed that, in the discussion above, only the force resulting from the inclination of the faces of the piston ring or ring segments has been considered. The total force which acts to expand the piston ring and cause it to conform to the shape of the wall of the clay chamber includes the force resulting from pre-compression of the ring or ring segments. Additionally, the clay or other material in the cylinder in front of the piston will act directly on the inner diameter of the ring. As a result of the design of the holding plate, and in some cases the piston, the reaction of the clay against the inner diameter of the piston ring will be transmitted vertically to the ring. This vertical force will be enhanced, as noted above, by the inclined bases of the gaps between the piston ring groove defining fingers of the holding plate.

While the same net effect can be obtained utilizing the piston ring designs represented in FIGS. 9 and 10 through judicious selection of the angles of inclination of the face or faces of the ring, in practice the design of FIG. 10 has been found to offer certain advantages. Thus, by way of example, the angle of inclination $\beta$ for the FIG. 10 embodiment need be only half that of angle $\alpha$ of the FIG. 9 version to achieve the same effect and the radial forces exerted on the piston ring or ring segments are more evenly distributed over the ring in the case of the design depicted in FIG. 10. This, in turn, results in the embodiment of FIG. 10 being less subject to torsional stress.

To summarize, in accordance with the present invention at least fifty percent of the surface area of an inclined leading face of a piston ring on an ejector piston, for example in a clay gun, is in direct contact with the material to be ejected from the cylinder in which the piston moves. This results in a portion of the axial thrust of the piston being transmitted, in the outward radial direction, to the piston ring or ring segments during the delivery stroke. During the retraction or recovery stroke of the piston there will also be a radial force transmitted to the piston ring by the rearwardly facing inclined surface on the holding plate for the piston ring.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In an apparatus for use in the dispensing of viscous material, the apparatus including a cylinder having a longitudinal axis from which the material is expelled under pressure via an opening of reduced diameter, an improved ejector piston for installation in the cylinder comprising:
    a piston body;
    holding plate means, said holding plate means being affixed to said piston body at the forward end thereof in the direction of piston travel during the delivery stroke to expell material from the cylinder, said holding plate means cooperating with said piston body to define a groove about the periphery of said piston body, said groove having a base portion and outwardly extending wall portions, said holding plate means at least in part defining a plurality of circumferentially spaced flow paths through said plate means for material in the cylinder in front of the piston body, said flow paths directly communicating with the base of said groove; and
    piston ring means disposed in said groove, said piston ring means including at least one ring member having a leading face inclined radially outwardly and forwardly with respect to said axis, a portion of said ring member inclined leading face being directly exposed to material in the cylinder via said flow paths, a portion of said piston ring means facing the base portion of said groove also being directly exposed to material in the cylinder via said flow paths.

2. The apparatus of claim 1 wherein said holding plate means includes:
   a central portion, said central portion abutting said piston body; and
   a plurality of fingers extending radially outwardly from said central portion.

3. The apparatus of claim 2 wherein said holding plate means fingers define the forwardly disposed wall portion of said groove, said fingers having a surface contour complementary to the inclined face of said ring means ring member, the spaces between said fingers defining said discontinuous surface whereby material in the cylinder can act directly on said ring means inclined face in the regions between said holding plate means fingers.

4. The apparatus of claim 3 wherein said ring member has an inner diameter and wherein said holding plate means fingers also define the base portion of said groove whereby the inner diameter of said ring means ring member will be directly acted upon by material in the cylinder.

5. The apparatus of claim 1 wherein the flow paths through said holding plate means encompass in excess of 50% of the surface area of the inclined leading face and groove base facing portion of said ring means ring member.

6. The apparatus of claim 4 wherein said holding plate means fingers cover less than 50% of the inclined leading face of said ring means ring member.

7. The apparatus of claim 2 wherein said piston body has a forwardly disposed section of reduced diameter and wherein said holding plate means central portion is of annular shape and has an inner diameter commensurate with the diameter of said piston body reduced section whereby said holding plate means is received on said piston body reduced diameter section.

8. The apparatus of claim 6 wherein said piston body has a forwardly disposed section of reduced diameter and wherein said holding plate means central portion is of annular shape and has an inner diameter commensurate with the diameter of said piston body reduced section whereby said holding plate means is received on said piston body reduced diameter section.

9. The apparatus of claim 2 wherein said holding plate means central portion slopes rearwardly and outwardly from the front face thereof in the spaces between said fingers.

10. The apparatus of claim 6 wherein said holding plate means central portion slopes rearwardly and outwardly from the front face thereof in the spaces between said fingers.

11. The apparatus of claim 10 wherein said piston body has a forwardly disposed section of reduced diameter and wherein said holding plate means central portion is of annular shape and has an inner diameter commensurate with the diameter of said piston body reduced section whereby said holding plate mean is received on said piston body reduced diameter section.

12. The apparatus of claim 1 wherein a clearance of at least 1 mm is provided between the forwardly disposed wall portion of the groove as defined by said holding plate means and said inclined face of said piston ring means ring member during the delivery stroke of the piston.

13. The apparatus of claim 2 wherein said holding plate means central portion is of frustoconical shape with its smaller diameter end being disposed at the front of said piston body.

14. The apparatus of claim 1 wherein said piston ring means comprises:
   a first ring member, said first ring member having said inclined leading face and an oppositely disposed trailing face oriented generally transversely to the cylinder axis; and
   a second ring member, said second ring member abutting said first ring member trailing face, said second ring member having a trailing face which faces the rearwardly disposed wall of said groove as defined by said piston body.

15. The apparatus of claim 4 wherein said piston ring means comprises:
   a first ring member, said first ring member having said inclined leading face and an oppositely disposed trailing face oriented generally transversely to the cylinder axis; and
   a second ring member, said second ring member abutting said first ring member trailing face, said second ring member having a trailing face which faces the rearwardly disposed wall of said groove as defined by said piston body.

16. The apparatus of claim 15 wherein said second ring member trailing face is inclined rearwardly and outwardly with respect to the cylinder axis and said piston body groove wall defining surface is of complementary shape to said second ring member trailing face.

17. The apparatus of claim 16 wherein said ring members have inner diameters and wherein said holding plate means fingers cover less than 50% of the inclined leading face of said first ring member and in excess of 50% of the inner diameters of said ring means ring members are directly exposed to the material via the flow paths.

18. The apparatus of claim 17 wherein said piston body has a forwardly disposed section of reduced diameter and wherein said holding plate means central portion is of annular shape and has an inner diameter commensurate with the diameter of said piston body reduced section whereby said holding plate means is received on said piston body reduced diameter section.

19. The apparatus of claim 18 wherein said holding plate means central portion slopes rearwardly and outwardly from the front face thereof in the spaces between said fingers.

20. The apparatus of claim 19 wherein a clearance of at least 1 mm is provided between the forwardly disposed wall portion of the groove as defined by said holding plate means and said inclined face of said piston ring means ring member during the delivery stroke of the piston.

21. The apparatus of claim 14 wherein said first and second ring members are split rings with at least a first step in the line of separation thereof.

22. The apparatus of claim 1 wherein said ring means comprises:
   a pair of juxtapositioned rings, the outer lateral faces of said rings being oblique and convergent in the direction of the axis of the cylinder.

23. The apparatus of claim 22 further comprising:

pin means for preventing relative rotation of said rings.

24. The apparatus of claim 22 wherein said rings are of split ring construction and have at least a first offset in the space between the oppositely disposed ends thereof.

25. The apparatus of claim 24 further comprising:
pin means for preventing relative rotation of said rings.

26. The apparatus of claim 25 wherein said holding plate means includes:
a central portion, said central portion abutting said piston body; and
a plurality of fingers extending radially outwardly from said central portion.

27. The apparatus of claim 26 wherein said holding plate means fingers define the forwardly disposed side of said groove, said fingers having a surface contour complementary to the inclined face of said ring means ring member, the spaces between said fingers defining said discontinuous surface whereby material in the cylinder can act directly on said ring means inclined face in the regions between said holding plate means fingers.

28. The apparatus of claim 27 wherein said holding place means fingers cover less than 50% of the inclined leading face of said ring means.

29. The apparatus of claim 28 wherein said holding plate means central portion is of frustoconical shape with its smaller diameter end being disposed at the front of said piston body.

30. The apparatus of claim 1 wherein said holding plate means comprises a disc, said disc being provided with a plurality of passages therethrough which define said flow paths, said disc further having a peripheral portion with an inwardly facing wall which is complementary in shape to said ring means inclined leading face.

31. The apparatus of claim 30 wherein said piston body is provided with notches in registration with holding plate means apertures, the piston body between said notches defining the discontinuous base of said groove.

* * * * *